(12) United States Patent
Wright et al.

(10) Patent No.: US 9,227,622 B2
(45) Date of Patent: Jan. 5, 2016

(54) HYBRID VEHICLE CONTROL FOR TRAVELING OVER A GRADE

(71) Applicant: Ford Global Technologies, LLC, Dearborn, MI (US)

(72) Inventors: Robert Wright, Royal Oak, MI (US); Jeffrey Allen Doering, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/052,976

(22) Filed: Oct. 14, 2013

(65) Prior Publication Data

US 2015/0105949 A1 Apr. 16, 2015

(51) Int. Cl.
| | |
|---|---|
| *B60L 9/00* | (2006.01) |
| *B60W 20/00* | (2006.01) |
| *B60W 10/02* | (2006.01) |
| *B60W 10/06* | (2006.01) |
| *B60W 30/18* | (2012.01) |
| *B60W 40/076* | (2012.01) |

(52) U.S. Cl.
CPC ............... *B60W 20/10* (2013.01); *B60W 10/02* (2013.01); *B60W 10/06* (2013.01); *B60W 30/18009* (2013.01); *B60W 40/076* (2013.01); *Y10S 903/93* (2013.01)

(58) Field of Classification Search
CPC .............................. B60W 10/06; B60W 10/08
USPC .......................................................... 701/22
See application file for complete search history.

(56) References Cited

U.S. PATENT DOCUMENTS

| | | | |
|---|---|---|---|
| 5,927,415 A | 7/1999 | Ibaraki et al. | |
| 7,770,675 B2 | 8/2010 | Hayashi | |
| 8,068,019 B2 | 11/2011 | Bennie et al. | |
| 2010/0252343 A1 | 10/2010 | Hilberer | |
| 2011/0136625 A1 | 6/2011 | Yu et al. | |
| 2012/0010044 A1 | 1/2012 | Gibson et al. | |
| 2013/0158838 A1* | 6/2013 | Yorke et al. | 701/103 |
| 2014/0012471 A1* | 1/2014 | Nakaso et al. | 701/51 |
| 2014/0195078 A1* | 7/2014 | Severinsky et al. | 701/22 |

OTHER PUBLICATIONS http://www.porscheownersmanual.com/cayenne-owners-manual, "Porsch iManual 2011-cayenne", Nov. 16, 2012, 2 pages.

* cited by examiner

*Primary Examiner* — Michael D Lang
(74) *Attorney, Agent, or Firm* — David B. Kelley; Brooks Kushman P.C.

(57) ABSTRACT

A method for controlling a hybrid vehicle having an engine includes automatically stopping the engine in response to vehicle power demand dropping below currently available electrical power, and automatically starting the engine when vehicle power demand is at a first offset below currently available electrical power to reduce a time delay for starting the engine and increase a currently available vehicle power to move the vehicle up a grade in response to receiving a signal indicating a positive grade. A hybrid vehicle includes an engine, an electric machine, and a controller. The controller is configured to control starting/stopping of the engine in response to a first driver demand when receiving a signal indicative of a road grade angle exceeding a corresponding threshold and in response to a second driver demand otherwise.

18 Claims, 3 Drawing Sheets

HYBRID VEHICLE CONTROL FOR TRAVELING OVER A GRADE

TECHNICAL FIELD

Various embodiments relate to a hybrid vehicle and control of the vehicle while the vehicle is traveling over a grade.

BACKGROUND

Hybrid vehicles may have first and second prime movers, such as an internal combustion engine, and an electric machine. The vehicle may operate using either prime mover, or using both simultaneously. The vehicle may operate electrically depending on the amount of available electrical power and the vehicle loads, including driver demand and other vehicle accessory loads. When the battery state of charge reaches a lower limit, the engine may be started to provide additional power to the vehicle. The engine may also be started when the power or torque requirement of the vehicle will exceed that available from the electric machine.

When an additional external load on the vehicle is present, such as the vehicle traveling over a grade, the added load on the vehicle caused may exceed the electrical capability of the electric machine, and require the engine to be operating. A delay associated with starting or restarting the engine, or pulling up the engine, during vehicle operation may cause driveline disturbances, or may not meet vehicle drivability expectations.

SUMMARY

According to an embodiment, a method for controlling a hybrid vehicle having an engine is provided. The engine is automatically stopped in response to vehicle power demand dropping below currently available electrical power. In response to receiving a signal indicating a positive grade, the engine is automatically started when vehicle power demand is at a first offset below currently available electrical power to reduce a time delay for starting the engine and increase a currently available vehicle power to move the vehicle up a grade. The first offset is greater than a second offset for a vehicle on level ground.

According to another embodiment, a hybrid vehicle is provided with an engine, an electric machine, and a controller. The controller is configured to control starting/stopping of the engine in response to a first driver demand when receiving a signal indicative of a road grade angle exceeding a corresponding threshold and in response to a second driver demand otherwise.

According to yet another embodiment, a method for controlling a hybrid vehicle on a grade is provided. A slope signal is received. In response to a torque to accelerate the vehicle being within a first predetermined offset below an engine torque pull up schedule for a vehicle on level terrain, the engine is commanded to start to reduce a time delay for starting the engine and increase vehicle torque to move the vehicle when the slope is positive. In response to the torque to accelerate the vehicle being within a second predetermined offset above an engine torque shut down schedule based on a maximum available electric machine torque for a vehicle on level terrain, the engine is commanded to shut down to increase fuel efficiency when the slope is negative.

Various embodiments have associated, non-limiting advantages. For example, to increase fuel efficiency and user expectation of a hybrid vehicle, the vehicle may be operated in an electric only mode with the electric machine propelling the vehicle and the engine off. When the vehicle is going up a grade or uphill, the electric machine may have a reduced ability to accelerate and propel the vehicle due to a portion of the weight of the vehicle acting directly against the propulsive force. The present disclosure allows the vehicle to operate electrically depending on the vehicle demand and the grade. The present disclosure provides a vehicle where the engine may be shut down while the vehicle is operating and vehicle demand is to be met electrically in order to conserve fuel and meet user expectations. The engine may be pulled up in advance of a typical vehicle pull up schedule in order to anticipate and meet user demand and vehicle demand with the grade. Additionally, electric creep may be disabled when the vehicle is traveling over or stopped on a grade such that the engine is available to propel the vehicle when commanded and delays associated with an engine pull up are reduced.

DETAILED DESCRIPTION

As required, various embodiments of the present disclosure are disclosed herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
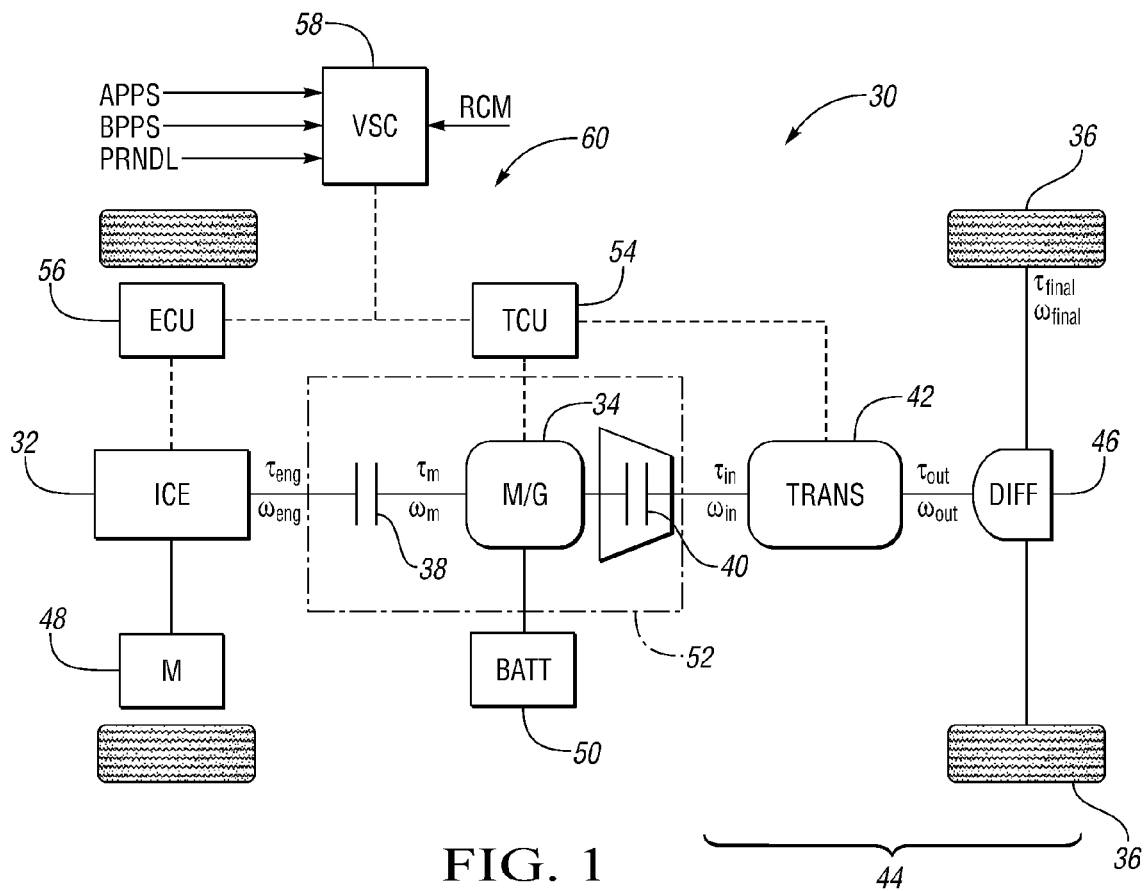
FIG. 1 is a schematic of a hybrid vehicle according to an embodiment.
Figure 2:
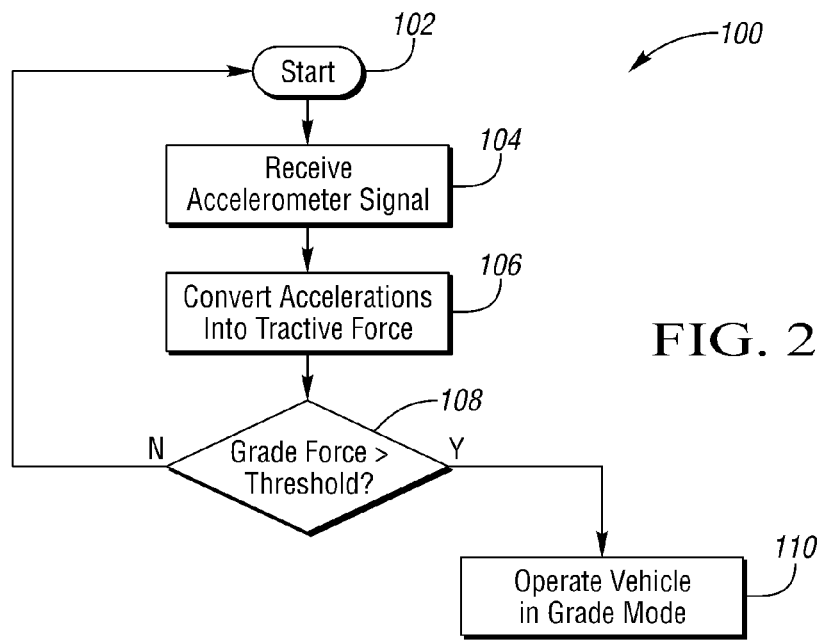
FIG. 2 is a flow chart illustrating a method of controlling a hybrid vehicle according to an embodiment.

FIG. 1 illustrates schematic of a hybrid vehicle 30 according to an embodiment. The vehicle 30 includes an engine 32, and an electric machine, which, in the embodiment shown in FIG. 2, is a motor generator (M/G) 34, and alternatively may be a traction motor. The M/G 34 is configured to transfer torque to the engine 32 or to the vehicle wheels 36.

The M/G 34 is connected to the engine 32 using a first clutch 38, also known as a disconnect clutch or the upstream clutch. A second clutch 40, also known as a launch clutch or the downstream clutch, connects the M/G 34 to a transmission 42, and all of the input torque to the transmission 42 flows through the launch clutch 40. Although the clutches 38, 40 are described and illustrated as hydraulic clutches, other types of clutches, such as electromechanical clutches may also be used. Alternatively, the clutch 40 may be replaced with a torque converter having a bypass clutch, as described further below. In different embodiments, the downstream clutch 40 refers to various coupling devices for the vehicle 30 including a traditional clutch, and a torque converter having a bypass (lock-out) clutch. This configuration may use an otherwise conventional automatic step-ratio transmission with a torque converter and is sometimes referred to as a modular hybrid transmission configuration.

The engine 32 output shaft is connected to the disconnect clutch 38, which in turn is connected to the input shaft for the M/G 34. The M/G 34 output shaft is connected to the launch clutch 40, which in turn is connected to the transmission 42. The various components of the vehicle 30 are positioned sequentially in series with one another. The launch clutch 40 connects the vehicle prime movers to the driveline 44, which includes the transmission 42, differential 46, and vehicle wheels 36, and their interconnecting components.

In another embodiment of the vehicle 30, the downstream clutch 40 is a bypass clutch with a torque converter. The input from the M/G 34 is the impeller side of the torque converter, and the output from the torque converter to the transmission 42 is the turbine side. The torque converter 40 transfers torque using its fluid coupling, and torque multiplication may occur depending on the amount of slip between the impeller and turbine sides. The bypass or lock-up clutch for the torque converter may be selectively engaged to create a mechanical or frictional connection between the impeller side and the turbine side for direct torque transfer. The bypass clutch may be slipped and/or opened to control the amount of torque transferred through the torque converter. The torque converter may also include a mechanical lockup clutch.

In the representative embodiment illustrated, the engine 32 is a direct injection engine. Alternatively, the engine 32 may be another type of engine or prime mover, such as a port injection engine or fuel cell, or use various fuel sources, such as diesel, biofuel, natural gas, hydrogen, or the like. In some embodiments, the vehicle 30 also includes a starter motor 48 operatively connected to the engine 32, for example, through a belt or gear drive. The starter motor 48 may be used to provide torque to start the engine 32 without the addition of torque from the M/G 34, such as for a cold start, some high speed starting events, or engine starts under towing load.

The M/G 34 is in communication with a battery 50. The battery 50 may be a high voltage battery. The M/G 34 may be configured to charge the battery 50 in a regeneration mode, for example when vehicle power output exceeds driver demand, through regenerative braking, or the like. The M/G 34 may also be placed in a generator configuration to moderate the amount of engine 32 torque provided to the driveline 44. In one example the battery 50 is configured to connect to an external electric grid, such as for a plug-in hybrid electric vehicle (PHEV) with the capability to recharge the battery from an electric power grid, which supplies energy to an electrical outlet at a charging station. A low voltage battery may also be present to provide power to the starter motor or other vehicle components, or low voltage power may be provided through a DC to DC converter connected to the battery 50.

In some embodiments, the transmission 42 is an automatic transmission and connected to the drive wheels 36 in a conventional manner, and may include a differential 46. The transmission 42 may be a step ratio transmission. In other embodiments, the vehicle may have other transmissions, including, continuously variable transmissions, manual transmissions, and the like. The vehicle 30 is also provided with a pair of non-driven wheels, however, in alternative embodiments, a transfer case and a second differential can be utilized to positively drive all of the vehicle wheels.

The M/G 34 and the clutches 38, 40 may be located within a motor generator case 52, which may be incorporated into the transmission 42 case, or alternatively, is a separate case within the vehicle 30. The transmission 42 has a gear box to provide various gearing ratios for the vehicle 30. The transmission 42 gearbox may include clutches and planetary gearsets, or other arrangements of clutches and gear trains as are known in the art. In alternative embodiments, the transmission 42 is a continuously variable transmission or automated mechanical transmission. The transmission 42 may be an automatic six speed transmission, other speed automatic transmission, or other gearbox as is known in the art.

The transmission 42 is controlled using a transmission control unit (TCU) 54 or the like to operate on a shift schedule, such as a production shift schedule, that connects and disconnects elements within the gear box to control the gear ratio between the transmission output and transmission input. The TCU 54 also acts to control the M/G 34, the clutches 38, 40, and any other components within the motor generator case 52.

An engine control unit (ECU) 56 is configured to control the operation of the engine 32. A vehicle system controller (VSC) 58 transfers data between the TCU 54 and ECU 56 and is also in communication with various vehicle sensors. The control system 60 for the vehicle 30 may include any number of controllers, and may be integrated into a single controller, or have various modules. Some or all of the controllers may be connected by a controller area network (CAN) or other system. The control system 60 may be configured to control operation of the various components of the transmission 43, the motor generator assembly 52, the starter motor 48 and the engine 32 under any of a number of different conditions, including in a way that minimizes a delay in power delivered by the vehicle in response to a user request when the vehicle is towing due to a time associated with an engine pull up sequence.

It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electrical devices as disclosed herein may be configured to execute a computer-program that is embodied in a non-transitory computer readable medium that is programmed to perform any number of the functions as disclosed herein.

Under normal powertrain conditions (no subsystems/components faulted), the VSC 58 interprets the driver's demands (e.g. PRND and acceleration or deceleration demand), and then determines the wheel torque command based on the driver demand and powertrain limits. In addition, the VSC 58 determines when and how much power or torque each power source needs to provide in order to meet the driver demand and/or vehicle demand and to achieve the operating points (torque and speed) of the engine 32 and M/G 34.

The VSC 58 selects the power and torque delivery mode based on the vehicle operating conditions and a predefined strategy. To this end, the VSC 58 receives a signal from a transmission range selector (PRND), an accelerator pedal position sensor output (APPS), and a brake pedal position sensor output (BPPS). The VSC also receives a signal from a road condition monitor (RCM), or another on-board controller having one or more accelerometers. The accelerometer may measure acceleration in the longitudinal, lateral, and/or vertical direction of the vehicle, and may also measure accelerations in other directions. The accelerometer may measure acceleration along any number of axes including one, two, three, and six axes.

In alternative embodiments, the clutch 40 may be replaced with a torque converter unit including a torque converter and a lockup clutch or bypass clutch. The torque converter has torque multiplication effects when certain rotational speed differentials exist across the torque converter. During torque multiplication, the output torque of the torque converter is larger than that of the input torque due to torque multiplication across the torque converter. Torque multiplication exists for example, when the vehicle 30 is started from rest and the input shaft to the torque converter begins to rotate, and the output shaft from the torque converter is still at rest or has just begun to rotate.

The lockup clutch or bypass clutch is used to lock out the torque converter such that the input and output torques for the downstream torque transfer device 40 are equal to one another, and the input and output rotational speeds for the device 40 are equal to one another. A locked clutch eliminates slipping and driveline inefficiency across the torque converter, for example, when the rotational speed ratio across the torque converter is greater than approximately 0.8, and may increase fuel efficiency for the vehicle 30.

In other embodiments, the method described herein may be applied to hybrid vehicle having other system architectures. In one example, a powersplit vehicle architecture may be used. An example of a powersplit hybrid vehicle is described in U.S. Pat. No. 6,994,360, issued on Feb. 7, 2006, the contents of which are incorporated by reference in their entirety herein.

For the vehicle 30, the engine 32 may be pulled up, or started for a number of reasons. The engine 32 may be started when the vehicle power demand approaches or exceeds the available electrical power that may be provided by the electric machine and the battery at that time. For example, the amount of electrical energy and power available may vary based on a battery state of charge, a maximum discharge rate of the battery, the power, speed, and torque limits of the electric machine, and the like.

The vehicle power demand may include driver demand, such as from a tip in request, and other accessory vehicle loads, including cabin conditioning systems, exterior lights, and the like.

The engine 32 may be started when the vehicle torque demand approaches or exceeds the available electrical torque that may be provided by the electric machine and the battery at that time. The available electrical torque may depend on the battery state, and the torque limit of the electric machine.

Other reasons for an engine pull up request include a battery state of charge reaching a minimum threshold value, a scheduled catalyst after treatment regeneration process, and the like.

FIG. 2 illustrates a flowchart describing a method 100 for use in controlling a hybrid vehicle according to an embodiment. In other embodiments, the method 100 may include a greater or fewer number of steps, and various steps may be performed sequentially or in parallel with one another. The steps in the method may also be ordered differently from the illustrated method in other embodiments.

The controller begins the method 100 at 102 and proceeds to block 104 where it receives a signal indicative of the vehicle accelerations. The vehicle accelerations may be measured by an accelerometer and in one embodiment, are determined using signals from the RCM, but could alternatively come from the anti-lock braking system (ABS), or other module.

At block 106, the controller converts the acceleration signals into a tractive force measurement or grade force for the vehicle. The controller may use various algorithms or methods to determine the tractive force using the grade force. A non-limiting example is given in U.S. Pat. No. 6,714,851, issued Mar. 30, 2004, incorporated by reference in its entirety herein. Another non-limiting example is given in U.S. application Ser. No. 12/888,546, published on Apr. 14, 2011 as 2011/0087398 and incorporated by reference in its entirety herein.

The controller may receive the actual grade based acceleration of the vehicle from a road condition monitoring (RCM) accelerometer, or the like. The controller calculates the grade angle using the grade based acceleration as the weight of the vehicle over the tangent of the grade angle. The accelerometer signal is an input to the VSC, which in turn estimates the road grade or road gradient. With a grade angle, the controller may then determine the tractive force (TF) pushing against the vehicle due to this grade (TF=Vehicle Weight*sine(grade angle)). The controller may then use additional known or determined values such as gear ratios, wheel radius, final drive ratios, torque converter state, etc. to determine an engine torque or power required to offset or equal the gravitational tractive force.

The algorithm 100 then proceeds to block 108, where it determines if the grade force is above a threshold value. The threshold value may be based on the vehicle electrical limits and other relevant factors. For an uphill grade, the grade force is larger than an associated threshold value. For a downhill grade, an absolute value of the grade force is larger than an associated threshold value.

If the grade force does not exceed the threshold value at 108, the method 100 returns to block 102 and the controller operates the vehicle normally, or operates the vehicle as if no grade was present.

If the grade force is above the threshold value at 108, the controller proceeds to block 110. At 110, the controller causes the vehicle to be operated in a grade mode. The grade mode may be set differently for different grade forces over the threshold value, and for different vehicle hybrid architectures. The grade mode may operate differently if the grade is an uphill or downhill section.

In one embodiment, the controller commands the engine to stop in response to vehicle power demand being less than a currently available electrical power. When in the grade mode, in anticipation of a vehicle power or torque demand that the electric machine may be unable to meet, the controller also commands the engine to start (or prohibits a shut down event) while vehicle demand is less than the currently available electrical power to reduce a time delay for starting the engine and increase a currently available vehicle power to move the vehicle on an uphill grade.

In the grade mode, the engine may be started before an accelerator pedal is actuated. For example, if a vehicle is approaching a stop, such as a traffic light, or the vehicle is placed into a park gear, the engine may be stopped to conserve fuel if the vehicle demand from accessory loads may be met electronically. The controller may anticipate a vehicle stop or a low vehicle demand based on a number of inputs including the brake pedal being actuated, the vehicle coasting, and the like. In anticipation of the user engaging the accelerator pedal with a tip in request, the engine may be restarted in response to a release of a brake pedal or shifting the vehicle out of park when the grade force is above the threshold, with the release determined using the BPPS or the gear shift lever. This essentially disables electric creep for the vehicle, as the engine is started as the brake pedal is released and is therefore available to contribute to vehicle creep. Based on the grade, the tip in request may exceed the electric machine capability to accelerate the vehicle, and so the engine is pulled up in advance to meet a potential user request.

The engine may be stopped when the controller receives a braking request from the BPPS, which would indicate that the driver demand is below road load for the vehicle and/or the grade force is less than the threshold. The engine may be pulled up or restarted if the road grade were to change the grade force to be above a threshold in anticipation of a tip in request at the accelerator pedal.

The engine may be commanded to start by the controller when vehicle power demand is at a first offset below the currently available electrical power and the grade force is above the threshold. Vehicle power demand may include multiple power demands in the vehicle, including user requested power from a tip in request, and power demands from vehicle accessory loads. The currently available electrical power is the maximum power output from the electric machine at that time, and may vary based on the battery state and the electric machine operating state.

The engine may be pulled up for a vehicle for other reasons when the vehicle demand is at a second offset below the currently available electrical power and when the grade force is below the threshold. The second offset is less than the first offset such that there is a larger power delta between a scheduled engine pull up for a vehicle in grade mode and a vehicle not in grade mode. In other words, the engine is pulled up sooner when the vehicle is on a grade based on the same currently available electrical power. The engine is pulled up sooner because the currently available electrical power may not be able to meet the same vehicle demand and accelerate the vehicle depending on the severity or steepness of the grade. The engine is also pulled up sooner to meet user expectations such that when the user tips in, the engine is operating to provide power to accelerate the vehicle. The engine does not operate when the vehicle is traveling on a grade and demand is below the first offset such that vehicle demand is met by the electric machine and user expectations of electric only operation for a hybrid vehicle may be met, and to conserve fuel and increase fuel economy for the vehicle.

The second offset may be implemented as a modification of the first offset. The second offset may be calculated or determined based on the grade, if known. The first and/or the second offsets or thresholds may be predetermined and provided to the vehicle controller as a calibration table, or may be calculated in real time as the vehicle operates.

In another embodiment, the vehicle controller commands the engine to start at a torque offset below an unloaded vehicle engine torque pull up schedule at 110. The controller may command the engine to start based on engine torque pull up schedule for an unloaded vehicle when the torque request for the engine reaches a specified value in the schedule. The engine torque pull up schedule may be a calibration table referenced by the controller. The torque offset may be based on the weight of the vehicle and the underlying grade, such that a larger torque offset occurs for a larger grade force. In other embodiments, the torque offset may be a fixed value, for example, the offset may be based on a maximum or preselected grade for the vehicle.

The controller may command the engine to stop when the torque request is below the torque offset of the engine torque pull up schedule, thereby conserving fuel.

For the engine stop and start commands, there may be a filter used with the engine pull up schedules to reduce hysteresis and the engine cycling on and off based on a torque or power demand fluctuating near the offset value for pull up.

Of course, torque, power, and speed are related to one another. If two of the three values are known, the third may be calculated. Torque is the product of power times rotational speed. Therefore, the engine torque is the engine power times the engine output shaft speed. The electric machine torque is the electric machine power output times the rotational speed of the electric machine output shaft. The power at the vehicle wheels is the torque at the wheels divided by the rotational speed of the wheels. Torque and power, as used in the examples herein, may be interchanged using rotational speed as the simple conversion between the two.

At 110, the vehicle controller may also command a downstream clutch 40 (or torque converter) to slip at vehicle launch. By slipping the downstream clutch 40, vehicle power production may be increased as the engine speed is permitted to increase. Alternatively, vehicle acceleration may be increased by slipping the downstream clutch 40.

For a vehicle 30, the controller may disable a locked torque converter 40 for a vehicle launch. By slipping the torque converter 40, the resulting torque multiplication across the torque converter results in a greater torque at the wheels to accelerate and propel the vehicle and trailer.

In another embodiment in grade mode at 110, the controller determines that the vehicle is on a downhill grade. When the absolute value of the grade angle or slope is above a threshold value, the controller may shut down the engine sooner to conserve energy based on the addition of the grade force on the vehicle.

Figure 3:
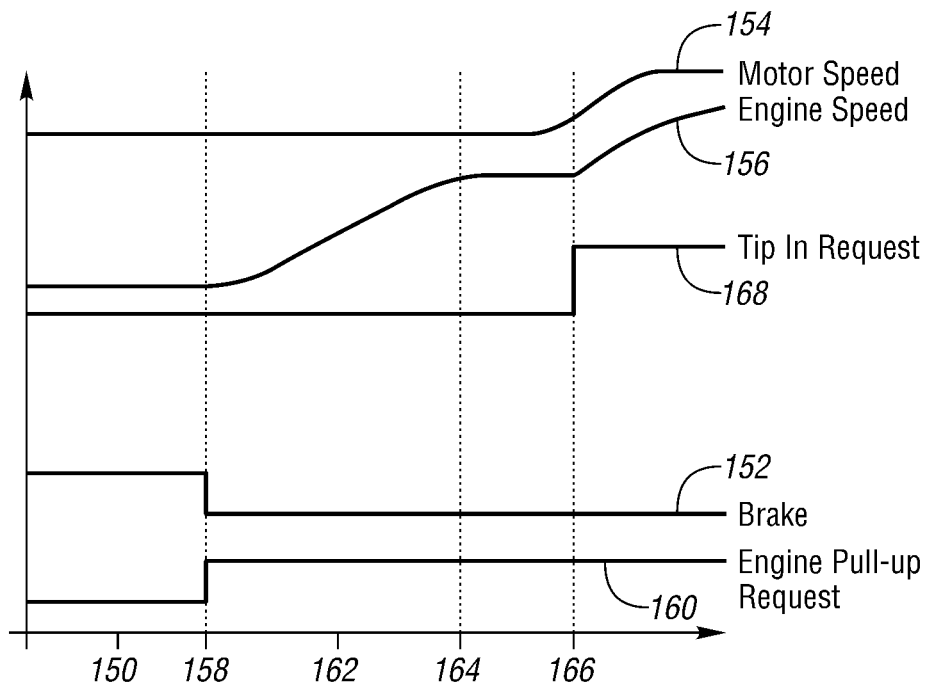
FIG. 3 is a timing chart illustrating an engine pull up for the hybrid vehicle according to an embodiment.

FIG. 3 illustrates a timing chart for a hybrid vehicle according to the present disclosure. The hybrid vehicle is located on an uphill grade such that the controller has caused the vehicle to enter the grade mode based on the grade force being above a threshold. The vehicle is at rest in zone 150. The user has the brake pedal depressed as shown by the brake input 152. The electric machine, as shown by the electric machine speed 154, is at rest. The engine, as shown by the engine speed 156, is also at rest. At time 158, the user releases the brake pedal 152. The controller then requests an engine pull up, as shown by engine command 160.

In zone 162, the engine speed 156 increases as the engine is pulled up. At time 164, the engine is operating at idle speed, the electric machine may or may not be operating, and the brake pedal and accelerator pedal are not engaged. The vehicle may be creeping at this point.

At time 166, the user provides a tip in request 168 to the accelerator pedal. The engine speed and electric machine speed (and torque and power) increase to meet the user and vehicle demand. By starting the engine when the brake pedal is released, the engine is operational before the accelerator pedal is engaged and there is no delay in vehicle acceleration and response due to an engine start sequence. Note that for vehicle operation when the vehicle is not in grade mode, the engine and the electric machine may be not be operational until the tip in request at time 166, thereby causing a power or torque delay as the electric machine and engine would begin operating at time 166 and the engine takes time to reach a synchronized speed or commanded speed.

Figure 4:
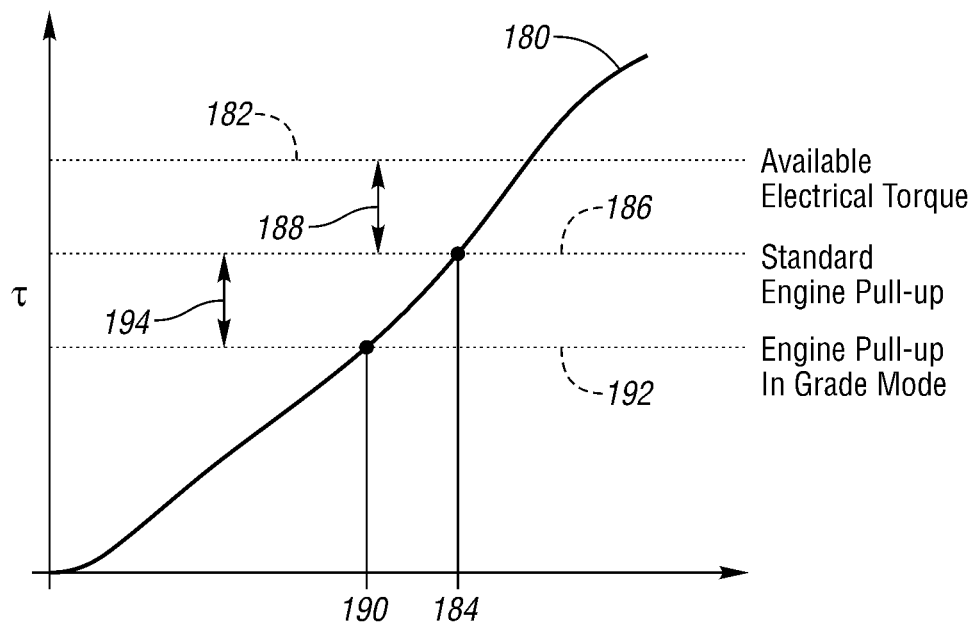
FIG. 4 is another timing chart illustrating engine pull up for the hybrid vehicle according to an embodiment.

FIG. 4 illustrates a chart for engine pull up based on vehicle torque for a hybrid vehicle according to an embodiment. The requested or demanded vehicle torque is shown at 180. The maximum available electrical torque is illustrated at 182. The maximum available electrical torque may be determined using the battery state of charge, the vehicle speed, the operating state of the electric machine, and other vehicle inputs. Multiple charts or tables may provide a maximum electrical torque and varying grades and grade forces.

The engine may be scheduled to be pulled up at 184, when the vehicle demand reaches a threshold 186 that corresponds to an engine pull up for a vehicle operating on a zero grade, or at a grade force below the threshold. Threshold 186 is at an offset 188 below the maximum available electrical torque 182 to provide a reserve or buffer region for a standard engine pull up.

When the hybrid vehicle is traveling over a positive grade (uphill), the controller may cause the vehicle to enter the grade mode based on the grade force. In the grade mode, the controller commands an engine pull up at 190 when the vehicle demand reaches a threshold 192 that corresponds to an engine pull up for a vehicle traveling up a grade, which may be a grade force above the grade threshold. Threshold 192 is at an offset 194 below the threshold 186 to provide an additional reserve or buffer region such that the engine is operating when a vehicle torque demand is received to provide the requested torque. The offset 194 may vary based on the severity or steepness of the grade, and may increase in value as the grade increases.

Note that although the maximum available electrical torque is the same regardless of the grade, a larger portion of the electrical torque may be used with the vehicle on a positive grade to meet the same vehicle demand. For example, based on the vehicle state and maximum available electrical torque, a vehicle on level terrain may be able to operate electrically up to 75% wide open throttle (based on accelerator pedal position and not engine throttle). The same vehicle having the same vehicle states, but with on a positive grade or traveling uphill, may only be able to operate electrically up to 60% wide open throttle.

A similar schematic as FIG. 4 may be provided with power replacing torque, and having an offset between power for engine pull up when the vehicle is in grade mode compared to standard operation. The offset for a vehicle not in grade mode is less than the offset for a vehicle in positive grade mode. The offset between the pull up power thresholds may be based on the value of the grade, such that the offset increases as the grade increases.

Figure 5:
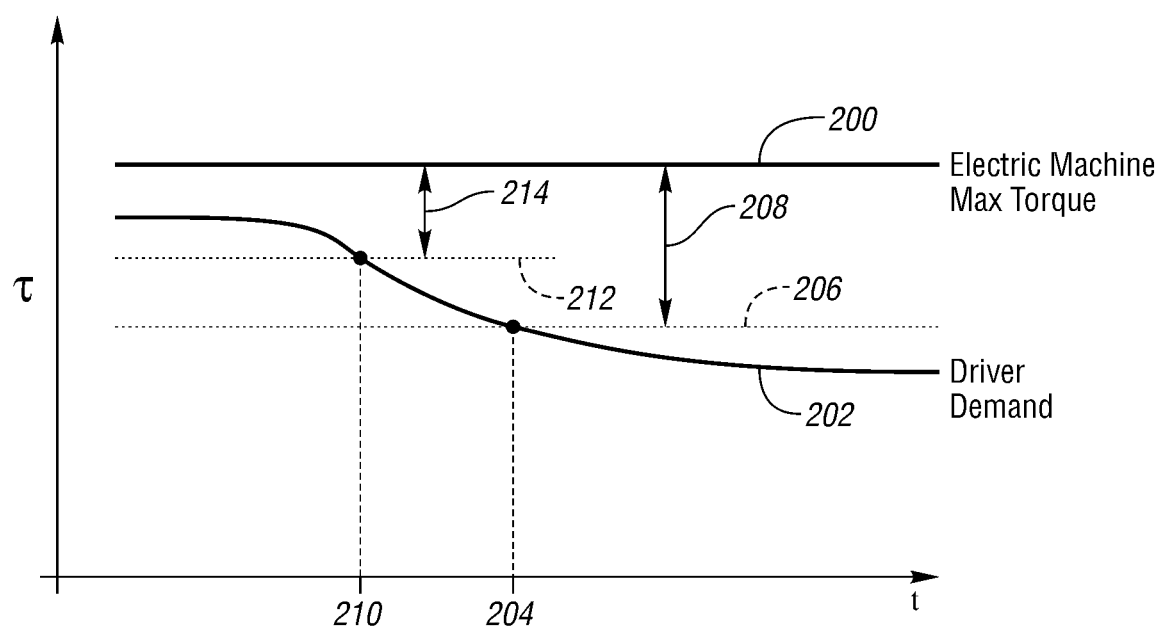
FIG. 5 is a yet another timing chart illustrating engine shut down for the hybrid vehicle according to an embodiment.

FIG. 5 illustrates a chart for engine shut down while in grade mode when the vehicle is on a downhill grade and shows torque versus time. The maximum available torque from the electric machine is illustrated by line 200. The maximum available electrical torque may be determined using the battery state of charge, the vehicle speed, the operating state of the electric machine, and other vehicle inputs. Multiple charts or tables may provide a maximum electrical torque and varying grades and grade forces.

The torque demanded by the vehicle, for example, driver demand torque, is shown by line 202. The engine may be scheduled to be shut down at 204, when the vehicle demand reaches a threshold 206 that corresponds to an engine shut down for a vehicle operating on a zero grade, or at a grade force below the threshold. Threshold 206 is at an offset 208 below the maximum available electrical torque 200 to provide a reserve or buffer region for a standard engine shut down. The offset 208 includes sufficient electric machine reserve torque such that the engine may be restarted based on changing conditions with sufficient time to meet vehicle demand.

As can be seen in FIG. 5, the drive demand is decreasing over time, which may be due to a downhill grade, or other factors. In FIG. 5, the controller has entered grade mode due to the vehicle being on a downhill grade and the absolute value of the grade angle being greater than a threshold. In the grade mode, the controller may command an engine shut down at 210 when the vehicle demand reaches a threshold 212 that corresponds to an engine shut down for a vehicle traveling down a grade, which may be an absolute value of a grade force being above the grade threshold. Threshold 212 is at an offset 214 below the maximum available electric torque 200, as a smaller reserve or buffer is needed based on the grade and the grade force on the vehicle. The offset 212 may vary based on the severity or steepness of the grade, and may decrease in value as the grade increases such that the engine may be shut off when vehicle demand 202 is closer to the electric machine torque threshold 200.

As such, various embodiments according to the present disclosure provide for increased fuel efficiency and user expectations of a hybrid vehicle while traveling over a grade, including uphill or downhill. The vehicle may be operated in an electric only mode with the electric machine propelling the vehicle and the engine off even when the vehicle is traveling uphill. When the vehicle is on a positive grade, the electric machine may have a reduced ability to accelerate and propel the vehicle due to the added forces on the vehicle due to the grade. Instead of disabling an electric only mode, as has been done in the prior art, the present disclosure allows the vehicle to operate electrically depending on the vehicle demand. The present disclosure provides for a vehicle where the engine may be shut down while the vehicle is operating and vehicle demand may be met electrically in order to conserve fuel and meet user expectations. The engine may be pulled up in advance of a typical vehicle pull up schedule in order to anticipate and meet user demand and vehicle demand with the added grade load. On a downhill, the engine may be shut down earlier as the electric machine is able to meet a larger vehicle demand based on the grade force.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for controlling a hybrid vehicle having an engine, comprising:
   automatically stopping the engine in response to vehicle power demand dropping below currently available electrical power; and
   in response to receiving a signal indicating a grade, automatically starting the engine when vehicle power demand is at a first offset below currently available electrical power to reduce a time delay for starting the engine and increase a currently available vehicle power to move the vehicle up the grade, wherein the first offset is greater than a second offset for a vehicle on level ground;
   wherein the first offset is selected to disable electric creep.

2. The method of claim 1 wherein the engine is started before an accelerator pedal is actuated.

3. The method of claim 1 wherein the engine is stopped in response to receiving a braking request indicating vehicle demand is less than a road load.

4. The method of claim 1 further comprising calculating a grade based on a comparison between actual vehicle acceleration and expected vehicle acceleration.

5. The method of claim 4 further comprising automatically starting the engine in response to a brake pedal release to reduce the time delay for starting the engine and increase the currently available vehicle power to move the vehicle up the grade in response to the grade being above a threshold value.

6. The method of claim 1 wherein the first offset is based on a steepness of the grade.

7. A hybrid vehicle comprising:
   an engine;
   an electric machine;
   a road condition monitor having at least one accelerometer; and
   a controller configured to control starting/stopping of the engine in response to a first driver demand when receiving a signal indicative of a road grade angle exceeding a corresponding threshold and in response to a second driver demand otherwise, and receive the signal indicative of the road grade angle from the at least one accelerometer.

8. The hybrid vehicle of claim 7 wherein controlling starting/stopping of the engine comprises starting the engine when receiving the signal indicative of a positive road grade angle exceeding the corresponding threshold and in response to the second driver demand otherwise, the second driver demand being higher than the first driver demand.

9. The hybrid vehicle of claim 7 wherein controlling starting/stopping of the engine comprises stopping the engine when receiving the signal indicative of a negative road grade angle exceeding the corresponding threshold and in response to the second driver demand otherwise, the second driver demand being less than the first driver demand.

10. The hybrid vehicle of claim 7 further comprising a transmission gearbox connected to the electric machine by a downstream clutch;
wherein the engine is connected to the electric machine by an upstream clutch.

11. The hybrid vehicle of claim 10 further comprising a torque converter, wherein the downstream clutch is a lockout clutch for the torque converter;
wherein the controller is further configured to slip the downstream clutch at a vehicle launch condition.

12. The vehicle of claim 7 wherein the road condition monitor is in communication with the controller and configured to provide the signal indicative of the road grade angle thereto as a grade based acceleration signal; and
wherein the controller is further configured to determine the road grade angle as a function of the grade based acceleration signal and a weight of the vehicle.

13. The vehicle of claim 12 wherein the controller is further configured to determine a grade force as a function of the road grade angle and a weight of the vehicle.

14. A method for controlling a hybrid vehicle on a grade comprising:
receiving a slope signal from an accelerometer in a road condition monitor sensor to determine a slope of a grade;
in response to a torque to accelerate the vehicle being within a first predetermined offset below an engine torque pull up schedule for a vehicle on level terrain, commanding the engine to start to reduce a time delay for starting the engine and increase vehicle torque to move the vehicle when the slope is positive; and
in response to the torque to accelerate the vehicle being within a second predetermined offset above an engine torque shut down schedule based on a maximum available electric machine torque for a vehicle on level terrain, commanding the engine to shut down to increase fuel efficiency when the slope is negative.

15. The method of claim 14 wherein the first and second predetermined offsets are based on a value of the slope.

16. The method of claim 14 further comprising calculating a grade force based on the slope of the grade;
wherein the torque to accelerate the vehicle is based on the grade force.

17. The method of claim 16 wherein the grade force is a function of the slope of the grade and a weight of the vehicle.

18. The method of claim 14 further comprising measuring an actual vehicle acceleration;
wherein the accelerometer provides a grade based acceleration as the slope signal; and
wherein the torque to accelerate the vehicle is calculated based on the actual vehicle acceleration compared to the grade based vehicle acceleration.

* * * * *